United States Patent [19]

Lemaire et al.

[11] Patent Number: 4,500,962
[45] Date of Patent: Feb. 19, 1985

[54] COMPUTER SYSTEM HAVING AN EXTENDED DIRECTLY ADDRESSABLE MEMORY SPACE

[75] Inventors: Edmond Lemaire, Maurepas par Trappes; Jacques Lebreton, Saclay par Orsay, both of France

[73] Assignee: U.S. Philips Corporation, New York, N.Y.

[21] Appl. No.: 534,266

[22] Filed: Sep. 22, 1983

Related U.S. Application Data

[63] Continuation of Ser. No. 288,565, Jul. 30, 1981, which is a continuation of Ser. No. 42,660, May 25, 1979, abandoned.

[30] Foreign Application Priority Data

Jun. 15, 1978 [FR] France ............................. 7817898

[51] Int. Cl.³ ............................................. G06F 9/06
[52] U.S. Cl. ................................................... 364/200
[58] Field of Search ................................. 364/200, 900

[56] References Cited

U.S. PATENT DOCUMENTS 3,500,466   3/1970   Carleton .............................. 364/200

Primary Examiner—Harvey E. Springborn
Attorney, Agent, or Firm—Jack E. Haken; James J. Cannon, Jr.

[57] ABSTRACT

A computer system utilizing an N bit word in which a directly addressable space is limited to $2^{N-1}$ words or $2^N$ characters by the system architecture. Extension of this directly addressable space to $2^N$ words is accomplished by a combination of a memory management circuit and a character selection signal instructions which allows both characters and words to be mixed in a first $2^{N-1}$ words of directly addressable space and words only to be addressed in a second $2^{N-1}$ words of directly addressable space.

3 Claims, 14 Drawing Figures

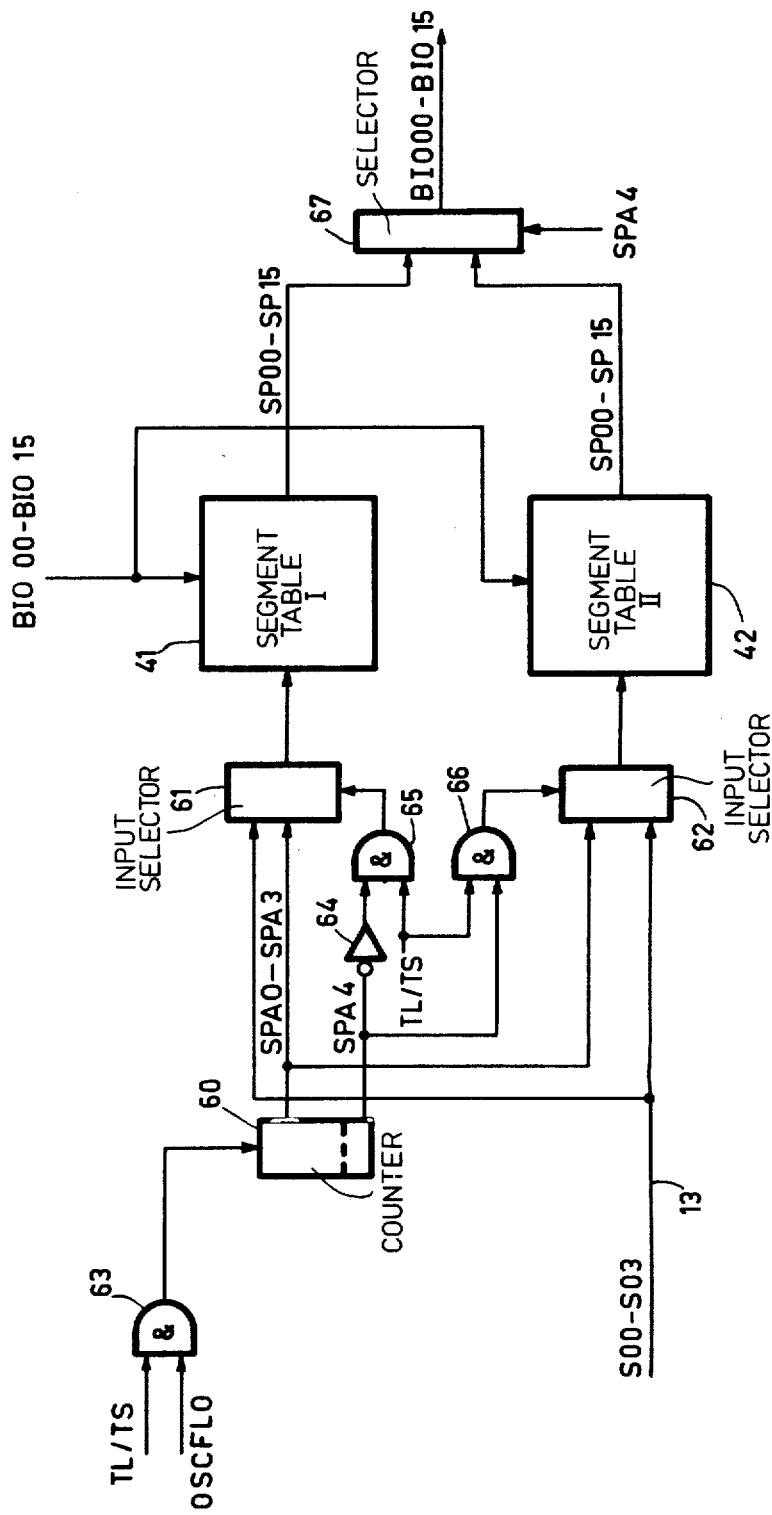

COMPUTER SYSTEM HAVING AN EXTENDED DIRECTLY ADDRESSABLE MEMORY SPACE

This is a continuation, of application Ser. No. 288,565, filed July 30, 1981, which is a continuation of Ser. No. 42,660, filed: May 25, 1979 now abandoned.

BACKGROUND OF THE INVENTION

1. Field of the Invention

The present invention is intended to provide improved solutions in a computer system having an N bit word oriented architecture which can directly address primary memory space limited to $2^{N-1}$ words of N bits each or $2^N$ characters of N/2 bits each whereby the total capacity of primary memory is extended beyond said specified limits although the directly addressable range of said primary memory space available to individual programs composed of instructions and data is still restricted to said specified limits.

2. Description of the Prior Art

Many minicomputers and microcomputers employ an architecture with 16 bit words and addresses and have conventionally a direct addressing range of 65536 (64K) words of 16 bits each, where 1K is equivalent to 1024. In many applications, it is desirable for reasons of flexibility and efficiency to have also the capability of directly addressing and operating on characters of half-word length. Therefore 1 bit in the address word is often reserved for direct character addressing, that is selection of the right or left hand character of 8 bits (odd/even character) in a 16 bit word. This further restricts the absolute directly addressable memory to a maximum of 32K words or 64K characters. With the increasing sophistication of both microcomputer and minicomputer applications in the fields of science and computer aided design, a larger directly addressable memory space is desirable to accommodate the larger application or user program requirements for instructions and particularly data. Hereinafter, "user program" is synonymous with "application program" and "code" with "instruction".

The provision of memory management, explained in greater detail hereinafter, permits the total primary memory capacity to be increased beyond the stated limits by the utilization of a segment table containing segment registers which map pages of individual programs into physical memory whose total capacity is greater than the 32K words of directly addressable memory space. However the directly addressable memory available to the user is still limited to 32K words as the user must still use a 16 bit program address. Thus the user is still required to write his application program either in less than 32K words, or if this is not practical to partition the program into several modules, each of which must fit into 32K words. This often proves to be an inefficient technique in terms of memory space utilization and program execution speed.

One solution to this problem widens all data and control paths, for example, from 16 to 32 bits. However, this is expensive and raises problems of compatibility with software designed for existing 16 bit, word oriented systems within the same computer family.

Other solutions proposing total separation of code and data could also increase the directly addressable memory space while imposing rigid limitations on the size of data and code sections.

An overview of known solutions is given in "Electronics" Nov. 8, 1973, pages 107–112.

SUMMARY OF THE INVENTION

The computer system according to the present invention is characterized in that the system further includes a technique to extend said directly addressable memory beyond said specified limits, by additional memory management techniques and additional instructions wherein direct addressing of instructions, word data and character data are permitted within a principal addressing space defined by a limit of $2^{N-1}$ words, with direct addressing of data words being permitted within an extended addressing space defined by a limit of $2^{N-1}$ words, said additional techniques comprising a detection circuit to distinguish between said instructions, word data and character data upon which memory operations are performed in said principal addressing space, and said additional data words upon which memory operations are performed in said extended addressing space, said total directly addressable memory space being defined by a limit of $2^N$ words.

Thus the total directly addressable memory available to the user, in the stated example where N=16, is increased from 32K words to 64K words, with no restriction in the utilization of the first 32K words where instructions word data and character data can be intermixed. In the next 32K words only word data can be directly addressed but this is not a serious limitation because typically instruction sections are smaller than data sections. The user is only required to insure that instructions are restricted to a maximum of 32K words, while the remainder of the directly addressable space, can be used for data. The problem of identifying and locating all instructions and data within their defined addressing spaces is resolved in the present invention, either by the addition of a small amount of hardware to the memory management unit, or by the addition of an additional instruction, together with minor modification to the memory management unit. In this patent application the central processing unit and the memory management unit shall henceforth referred be to as the CPU and MMU respectively.

A still further object of the invention is to include a memory management unit and instructions having a first segment table comprising a first group of K segment registers in combination with additional memory management logic and instructions comprising a second segment table comprising a second group of K segment registers, said first and second segment tables permitting paged memory operations within said principal addressing space and within said extension addressing space.

Thus the advantages of a larger directly addressable memory space are combined with the advantages inherent in a paged system to give a powerful and flexible system.

Another object of the invention is to provide still additional memory management logic and instructions having a segment table comprising a group of K segment registers, technique wherein the $K^{th}$ segment register in said group of K segment registers is utilized as a base register, said memory management and logic instructions being combined with said base register to permit paged memory operations in $\frac{2^{N-1}}{K}$ (K−1) words of said principal addressing space and unpaged memory operations in $2^{N-1}$ words of said extension addressing space.

Still another variation of the invention employs only one segment table with an additional $(K+1)^{th}$ register as a base register, thus permitting paged memory operations in $2^{N-1}$ words of principal addressing space and unpaged memory operations in a further $2^{N-1}$ words of extension addressing space.

These variants of the invention provide a particularly economic solution as only one segment table and therefore less hardware is required, but paged operations in the extension addressing space are not permitted. Other advantages of the invention will become clear in the description to follow of a preferred embodiment of the invention together with its variants. These are described with respect to the P 800 series of minicomputers manufactured by Philips Data Systems. Only those parts of the P 800 architecture, operating system structure, CPU and MMU pertinent to the present invention, and required as necessary background will be described in detail. Detailed descriptions of these elements which are not part of the present invention may be found in the cited references. The embodiments make use of the general structure of the elements referred to above, that is, they use the same interfaces, technology, control signals, clock signals, and data paths.

BRIEF DESCRIPTION OF THE DRAWINGS

In the list of figures which follow,

FIG. 6 is a detailed block diagram of the elements for loading the two segment tables of FIG. 4.

References. The following references published by Philips Data System, Apeldoorn, The Netherlands, are incorporated by reference herein.

| P 856 M/P 857 M | System Handbook (July 1975) | Publication Ref.: 5122-991-26931 |
|---|---|---|
| P 856 M/P 857 M | CPU Service Manual (May 1976) | Publication Ref.: 5111-991-2695X |
| Multi-Application System Manual | (March 1978) | Publication Ref.: 5122-991-08404. |

DESCRIPTION OF THE PREFERRED EMBODIMENT

Concise Description of the Prior Art System

The prior art P 800 architecture uses an address mechanism defined by a principal addressing space in which the direct addressing capability available to single programs is limited to a maximum of 32K words or 64K characters. Consecutive word addresses to memory, increment the contents of the CPU location counter (not shown) by 2, so that consecutive words in memory are located at even addresses 0, 2, 4, 8 to a total number of 32K. Thus the counter only utilizes the 15 most significant bits in the 16 bit logical address word. This holds true whether word data or code instruction are addressed, that is, instructions are always organized in full length words. The least significant bit within the address word is used to define character position (even-/odd) when character data is directly addressed. The user program specifies the type of addressing, that is, word or character, and the CPU makes use of this information to define word or character addressing via the state of a control bit CHA.

The address mechanism is thus defined:

MAD 00—MAD 14 (15 bits or lines) define memory word addresses up to maximum of 32K words.

$\overline{CHA}$.MAD 15 (2 bits or lines) define word address selection (MAD 15 not significant when CHA inactive).

CHA.$\overline{MAD\ 15}$ defines even character address selection.

CHA.MAD 15 defines odd character address selection.

Therefore, even/odd character addresses (data only) step by 1, 0, 1, 2, 3, to a total of 64K.

Figure 1:
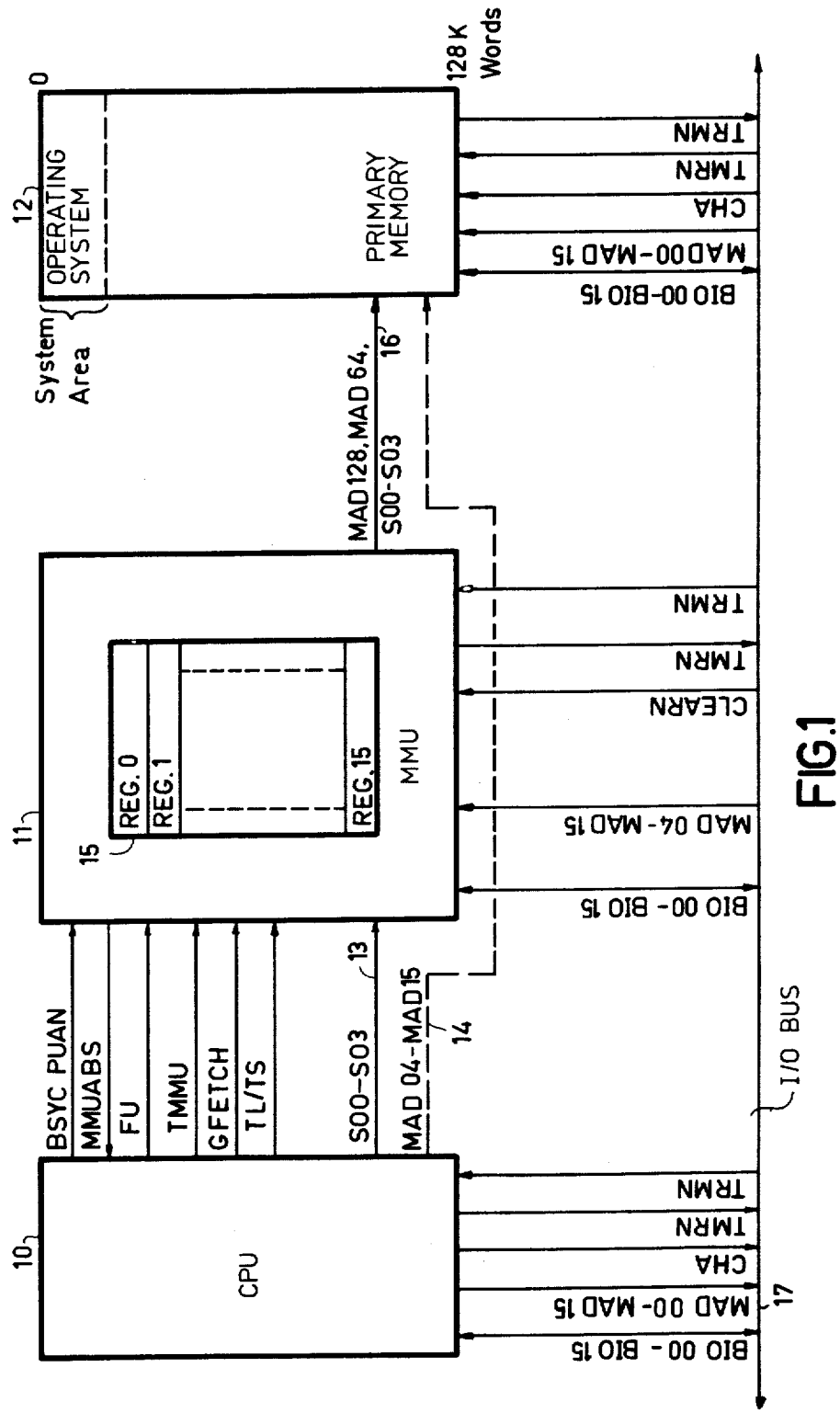
FIG. 1 is a block diagram of a prior art P 800 system incorporating a central processing unit CPU, memory management unit MMU, primary memory and control corrections operated by the operating system required to implement the address translation mechanism with respect to FIG. 1.

The utilization of a memory management unit MMU in a P 800 system allows the extension of primary memory to a maximum of 128K words. The address translation mechanism is described with respect to FIG. 1. Only those components and signals relevant to the description and understanding of the address translation are shown in FIG. 1. A list of the most important signals used during address translation are given in Table 1.

Logical 16 bit addresses from the CPU (10) are translated via the MMU (11) into real 18 bit physical addresses which can access a maximum of 128K words or 256K characters in primary memory (12). The 16 bit logical address originates in CPU (10) and is organized in 2 parts, a segment table pointer of 4 bits, S00–S03 (13), and a 12 bit page displacement part MAD 04—MAD 15 (14). The segment table pointer (13) is decoded in MMU (11) to point to one of 16 segment table registers of 16 bits each, REG0 . . . REG15 contained in the segment table (15). The 6 most significant bits contained in each segment table register define 1 out of 64 possible page numbers, which define the start address of a physical page of 2 K words or 4K characters in primary memory (12) by means of the 6 address lines MAD 128, MAD 64, S00–S03 (16). Thus address part (16) is combined with address part (14) to define a specific word or character address in memory (12) with a maximum addressing range of 128K words or 256K characters.

The primary memory (12) is partioned into a system area and a user area, the system area being always located at the beginning of memory (lowest addresses) and limited to a maximum of 32K words. It contains the set of supervisory programs, often called the operating system, such as monitors together with associated working areas such as buffers, tables, etc. The CPU (10), and hence the relevant user program operates either in system mode or in user mode. To address the system area the CPU (10) operates in system mode, the logical 16 bit address being directly used to address the system area in (12), without the need for address translation via MMU (11). However the system or supervisory programs need to communicate with the user area and this is done through a set of extended instructions in which address translation by MMU (11) is necessary. In addition, a set of instructions for loading/storing the segment table registers in segment table (15) are also provided. This total set of instructions for. use with MMU (11) are provided in the CPU (10) and are defined in Table II.

The user area contains the users' running programs of real-time tasks and begins immediately after the system area. For example if the system area is defined in the lowest 16K words (12) the user area is defined to occupy memory addresses higher than 16K words. The maximum length of a user program is limited to 16 pages of 2K words each, that is, a total of 32K words. In user mode the MMU (11) is activated and address translation from logical 16 bit addresses to 18 bit physical addresses occur. In its tables, the operating system keeps the complete set of pages for all user programs known to the system, and every time a different user program is activated, the operating system loads the segment table (15) with the set of page numbers (maximum 16) relevant to that program. There is no necessity for the total set of pages of a user program to simultaneously reside in primary memory (12), only a minimum set called the "working set" need to be loaded initially by the operating system. Further, pages can be loaded from secondary storage if and when required. A missing page required during user program execution is handled by the MMU (11), via the page descriptor mechanism loaded into the relevant segment table register in the segment table (15); for brevity, this is not explained further. All pages begin and end on the 2K word page boundaries defined by the 6 bit address (16).

Figure 2:
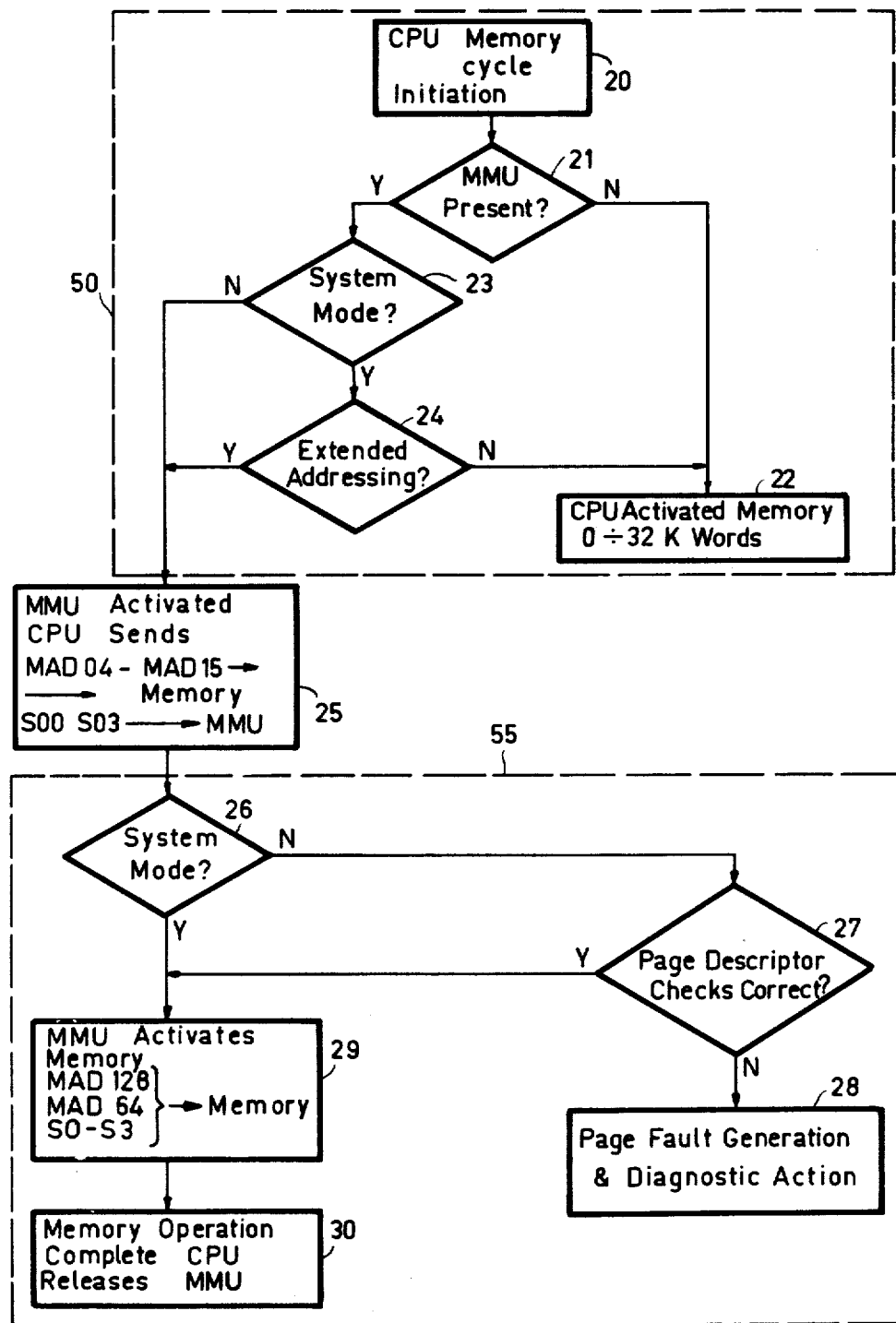
FIG. 2 is a system flowchart describing the sequence of steps necessary for address translation.

A functional description of the MMU with reference to FIG. 1 and the flowchart of FIG. 2 shows how address translation is physically performed. In the following description reference to FIG. 1 is implicit unless explicit reference is made to FIG. 2.

When the CPU (10) needs to address memory (12), it does so by first seizing control of the general purpose Input/Output (I/O) bus (17) by activation of a busy control signal BSYCPUAN, and from this point (10) has overall control of the following memory operation. This is shown in FIG. 2 as (20). If the MMU (11) is not present, indicated by active logical signal MMUABS, the CPU (10) directly activates primary memory (12) by means of memory activation signal TMRN via I/O bus (17), shown as (21) and (22) in FIG. 2. The memory address defined by address lines MAD 00—MAD 15 is sent to (12) via (17), with MAD 15 defining even or odd character if CHA is active. Depending on whether a read or write operation is specified, data is read out from, or written into the relevant location in (12) via the BIO-00-BIO-15 Input/Output data lines. As described before only the lowest 32K words of (12) are accessable by means of direct activation.

If the MMU (11) is present, indicated by signal MMUABS inactive, the type of access, that is, system or user mode, is monitored (23) in FIG. 2. This is achieved by means of logical signal FU from CPU (10) to MMU (11). If FU is inactive, CPU access is in system mode and the type of system access is next examined to determine if an extended address instruction for communication with the user area is to be executed, shown as (24) in FIG. 2. If no extended address is intended, then address translation is not required and the 0–32 K word area of primary memory (12) is direc2tly activated as before (22) in FIG. 2. If access is in user mode, indicated by FU active, or if extended addressing for communication with the user area is required, then the CPU (10) activates MMU (11) by activating the translation control signal TMMU. The CPU (10) sends the page displacement address MAD 04—MAD 15 and bit CHA directly to (12) via (17), and the segment table pointer S00–S03 (13) to the segment table (15) in MMU (11). This is shown as (25) in FIG. 2. In user mode the MMU (11) performs certain checks relevant to the page descriptor, (such as type of page, page present or missing, memory protection, etc.) which are not pertinent to the invention. If the results of these checks are positive, address translation occurs through MMU (11) and memory (12) is activated. If these checks are negative, a page fault signal is generated and the system takes appropriate diagnostic action. These operations are shown as (26), (27) and (28) in FIG. 2. If the page descriptor checks are correct, or if access is in system mode, MMU (11) activates (12) by means of control signal TMRN. The MMU (11) performs address translation by sending the physical page number MAD 128, MAD 60, S00–S03, (16) addressed in segment table (15) by segment pointer (13) to (12), which together with the page displacement address MAD 04—MAD 15 sent via (17) specifies the relevant physical address in (12) up to a maximum of 128K words or 256K characters. As before, depending on the type of memory operation, information (data or code) is either written into, or read from the addressed memory location via the BIO-00-BIO-15. This activity is shown as (29) in FIG. 2. At the completion of the memory operation, (12) sends a TRMN control signal to CPU (10) via (17) which in turn releases MMU (11) be deactivation of control signal BSYCP-UAN. This is shown as (30) in FIG. 2.

The control signal GFETCH is activated by CPU (10) during every fetch cycle executed by the CPU, causing the contents of the CPU instruction counter (P counter) to be loaded into the instruction buffer of the MMU (11) addressed via address lines MAD 04—MAD 15 and loaded via the BIO-00-BIO-15 lines. Thus, the extended instructions defined in Table II can be executed by the MMU for communication between the system and user area. Obviously for execution of MMU instructions other than address translation, other control signals and different logic sequences are required. Some of these control signals are defined in Table II for completeness, although neither they nor the different logic sequences are pertinent to the present invention, as they are used in exactly the same manner either with a normal P 800 system or with a P 800 system incorporating the present invention.

It should be realized that the segment pointer S00-S03 shown as (13) in FIG. 1 is equivalent to the address lines MAD 00—MAD 03 and both normally carry the same information content, that is, the 4 most significant bits of the CPU memory address register. When address translation occurs these bits are sent to the MMU as a segment pointer, otherwise they are sent via the I/O bus (17) as part of the normal memory address. It is also pointed out that the address lines MAD 04—MAD 15 shown as broken line (14) in FIG. 1 have been shown symbolically to explain the address translation mechanism. These address bits are always sent via the I/O bus (17) to the MMU (11) or to memory (12). The address translation process is transparent to the user who does not need to know into which areas of memory his program is loaded.

By utilization of an MMU as described, primary memory up to 128K words can be accessed. However, each user program is still restricted to a maximum of 32K words because only the 16 bit CPU logical address is available for programming purposes.

DESCRIPTION OF A FIRST EMBODIMENT OF THE INVENTION

The present invention defines the following address mechanism:

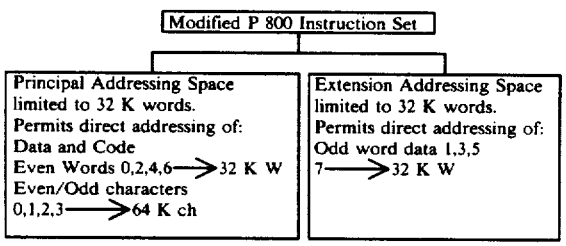

Figure 3:
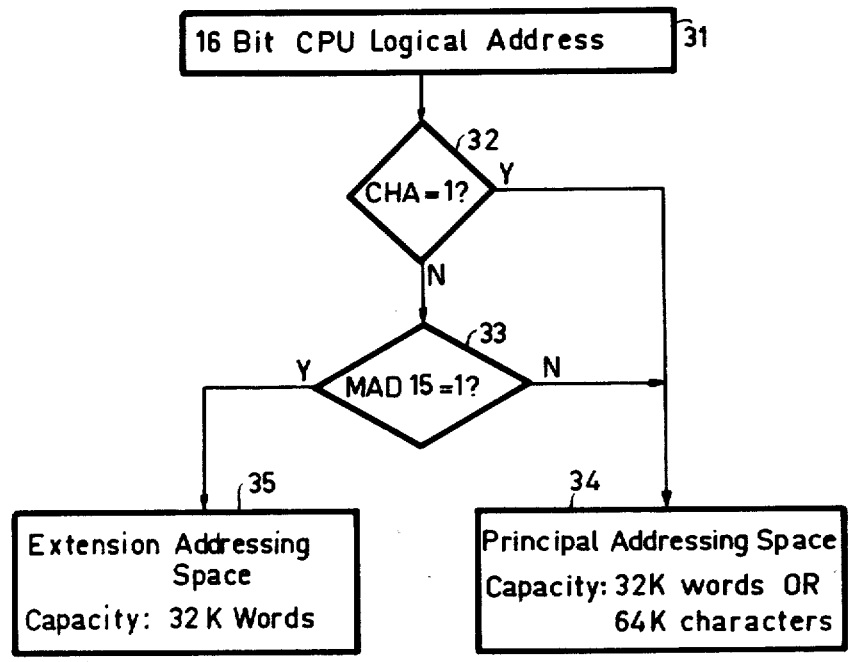
FIG. 3 is a flowchart describing the inventive addressing mechanism necessary to realize the invention without consideration of a paged memory organization.

The above addressing mechanism is described with respect to the flowchart of FIG. 3. When the user program needs to access memory, the 16 bit logical CPU address word (31) is examined to determine if it is a character or word address (32). If bit CHA is active (CHA = 1) a character address is specified, and the address word is directed to the principal addressing space (34). If CHA is inactive a word address is specified, and the least significant bit MAD 15 of the address word is examined (33). If MAD 15 = 0 an even word is specified and the address word is again directed to principal addressing space (34). If MAD 15 = 1, an odd word is specified and the address word is directed to the extension addressing space (35). Instructions are always addressed as words, with MAD 15 not significant. Therefore they are defined as even words located in the principal addressing space (34).

Figure 5:
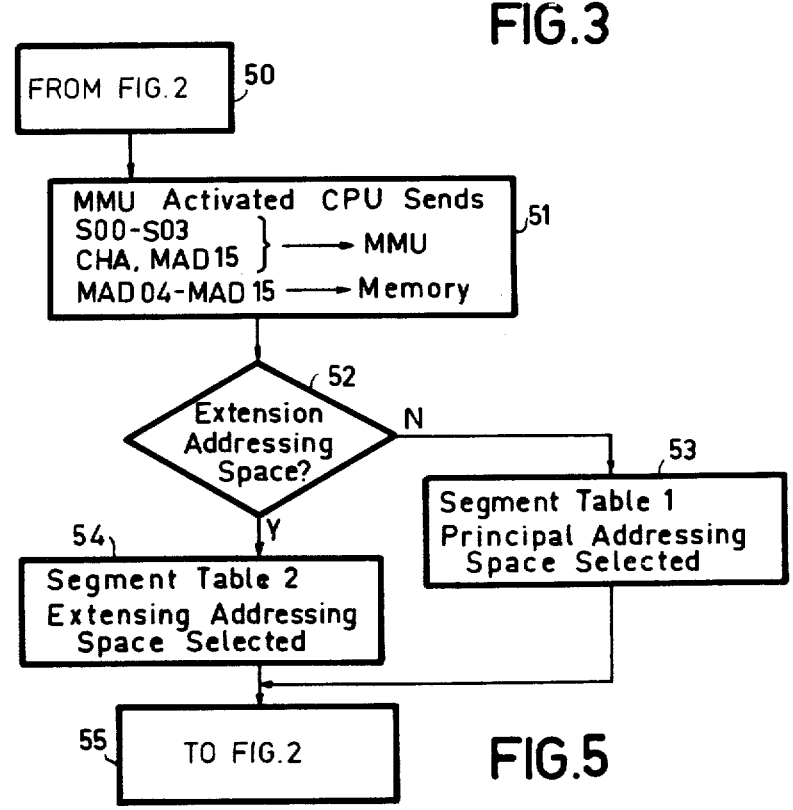
FIG. 5 is a flowchart describing the sequence of steps necessary for address translation with respect to FIG. 4.
Figure 4:
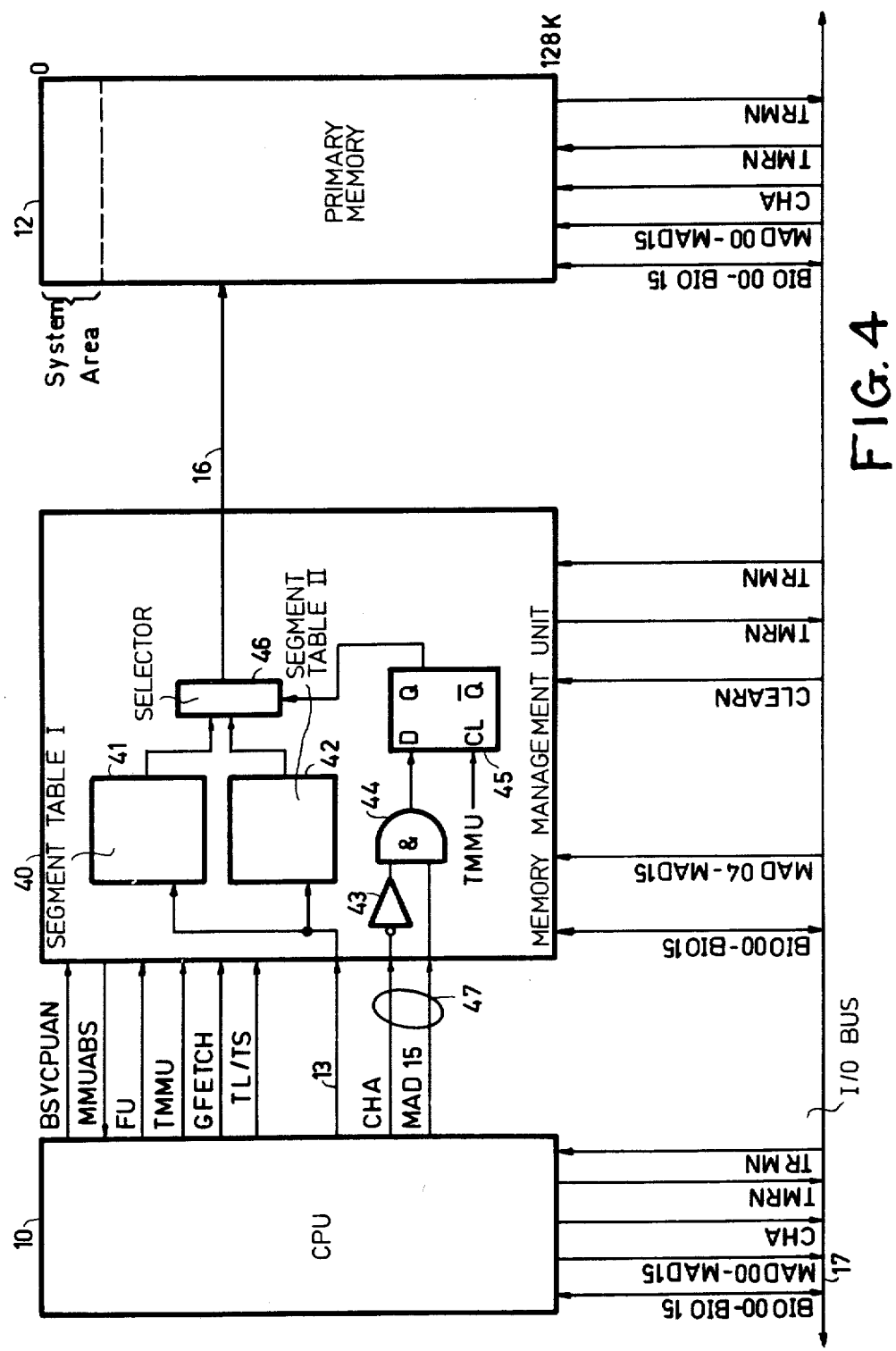
FIG. 4 is a block diagram of a P 800 system incorporating the modifications and additions necessary to the MMU to realize the invention with two segment tables.

An MMU is a pre-requisite for this addressing mechanism, and an embodiment of the invention is described with respect to the block diagram of FIG. 4 and the flowchart of FIG. 5. A large part of the address translation procedure is the same as that described with respect to FIGS. 1 and 2. Description of the embodiment with reference to FIG. 4 is implied unless explicit reference is made to FIG. 5. The CPU (10) uses exactly the same procedure as before to seize control of I/O bus (17) and to activate primary memory (12) when the modified MMU (40) is not present or address translation not required. This is shown as (50) in FIG. 5. When address translation is required, MMU (40) is activated as already described with the page displacement address MAD 04—MAD 15 being sent to (12). The segment table pointer (13) together with bits MAD 15 and CHA (47) sent to the MMU (40), shown as (51) in FIG. 5.

The states of the 2 bits CHA and MAD 15 are examined simultaneously. With reference to FIG. 3 this has been described as separate steps for the sake of clarity, however from a hardware viewpoint it is convenient to examine them simultaneously. For the condition $\overline{CHA}$.MAD 15 = true, an odd word address and hence extension addressing space is specified, for all other conditions of CHA.MAD 15 principal addressing space is specified. The segment table pointer (13) points simultaneously to segment table 1 (41), which defines principal addressing space, and segment table 2 (42) which defines extension addressing space. Each of these segment tables comprises 16 registers, each of which contains a 6 bit physical page address in the 6 most significant bit positions. If $\overline{CHA}$.MAD 15 = true then selector (46) is conditioned to select, at its input, the 6 bit gated output of (42), which defines the physical page number in extension addressing space. This is achieved via invertor (43), AND gate (44) and a clocked bistable (45).

For $\overline{CHA}$.MAD 15 = true the D input of bistable (45) is logic 1 and its Q output is set to logic 1 when clocked by translation control signal TMMU used during address translation. This causes the physical page number from (42) to be selected. For all other conditions of CHA.MAD15 during address translation by the MMU (40), selector (46) is conditioned to choose the physical page number gated from the output of (41), that is, principal addressing space. When principal addressing space is specified (for instructions, character addresses or even word data addresses) the D input of bistable (45) is logic 0 because the Q output must be reset to 0 when strobed by TMMU. This in turn causes the output from (41) to be selected by (46). These logical branches are shown in the flowchart of FIG. 5 as (52), (53) and (54). As before the 6 bit physical page number (16) output by (46) is concatenated with MAD 04—MAD 15 to specify a memory location in (12). The rest of the address translation procedure is as described before and is shown in FIG. 5 by (55). When address translation by the MMU (40) is not required the physical page numbers from (41) and (42) are not gated, that is, zero is output via (16), the full address coming via the bus (17) on the MAD lines.

Although the segment pointer (13) will point to identical segment table registers in segment tables (41) and (42), each will have been loaded with a different page number by the operating system and therefore pages in both principal and extension addressing spaces may be scattered throughout primary memory (12) in a manner defined by the operating system.

Thus the user, though still restricted to a 16 bit logical address, can now directly address 64K words of memory with the possibility of paged operations throughout this addressing space. The user is not required to separate data from code or to separate character data from word data, the only important constraint being that code must not exceed 32K words. Although from the viewpoint of memory utilization it is more economical to store only word data in extension addressing space as described in the invention, the user may of course also directly address character data in extension addressing space by utilizing the mechanism described in FIG. 3. However, the character would have to be addressed in the same manner as an odd word and only 32K characters instead of 64K characters will be directly addressable in the 32K words of extension addressing space. In Table II the set of instructions for use with an MMU have been defined. Only the TLR, TL, TSR and TS instructions are influenced by the described invention. These are the Segment Table Load/Store Instructions. It is now necessary to load/store both first and second segment tables whenever control is transferred to a different user program. Two solutions may be implemented.

In the first solution the LTR, TL, TSR and TS instructions are used in modified form. Instead of 16 consecutive registers in the MMU being loaded or stored (i.e. segment table 1), 32 consecutive registers in the MMU are now loaded or stored (segment tables 1 and 2). In order to execute these instructions for 32 instead of 16 registers, a further modification of the MMU is necessary, and a specific embodiment is described with respect to the logic block diagram of FIG. 6.

The present MMU has a 4 bit segment table address counter which is used during segment table load/store instructions. This is extended by an additional fifth most significant bit as shown as (60) in FIG. 6. During a segment table load/store instruction a load/store signal TL/TS enables a clock signal OSCFLO to be applied to counter (60) through AND gate (63).

The 4 least significant bits SPA0-SPA3 of (60) are applied to one input of selectors (61) and (62), the other inputs of (61) and (62) receiving the segment table pointer S00-03 (13). Most significant bit SPA4 of (60) is used to condition selectors (61) and (62). If SPA4=0 during a load/store instruction, input SPA0-SPA3 is selected by (61) via inverter (64) and AND gate (65). This occurs for all binary values of SPA0-SPA4 up to 15. Thus each register of the segment table 1 (41) is successively addressed each time (60) is clocked. When the count reaches binary 16, SPA4=1, and selector (62) is conditioned via AND gate (66) to select input SPA0-SPA3. This allows each register of segment table 2 (42) to be consecutively addressed when counter (60) is counted from 16 to 31. A 32nd pulse resets counter (60) to binary 0. During periods other than selection of a segment table load/store instruction the S00-S03 (13) input is selected by selectors (61) and (62).

During a table load instruction the information on the BI0-00-BI0-15 lines is strobed into the selected register either in (41) or (42). The strobe signal (not shown in FIG. 6) is only enabled for the selected segment table, that is, it is controlled by the state of (60). During a table store instruction, the selected output SP00-SP15 either from (41) or (42) is gated to the input of selector (67). The state of SPA4 conditions (67) to select either the output of segment tables (41) or (42) which in turn is output on the BI0-00-BI0-15 lines to memory (12). Selector (67) might be used to control other information during execution of other MMU instructions but this is not shown for brevity.

In the second solution an extra table load/store instruction which operates exclusively on the segment table 2 (for extension addressing space) is implemented in the CPU. This instruction is defined in Table II as using instruction code binary 0.1010 (12 decimal, this particular code being free and hence available for use in the P 800 instruction set. The four instructions defined are variations of the basic instruction code binary 1010.12, and are added to the microprogram control section of the CPU in which the addition of extra instructions had been foreseen and appropriate space provided.

In this case the CPU will control the table load/store operations on segment table 2 in exactly the same manner as the normal load/store operations on segment table 1, that is, the instructions will be loaded into the P buffer of the MMU, and the instruction executed normally with respect to segment table 2. The modifications necessary to the MMU as described with reference to FIG. 6 are not needed in this case. However provision must be made for connection of all the appropriate selected, address, data and control signals to segment table 2 in the MMU.

The first solution has the advantage that no extra instructions are required to be added, but the MMU requires some extra modifications.

DESCRIPTION OF A SECOND EMBODIMENT OF THE INVENTION

A variant of the invention uses only one segment table, that is, the principal addressing space segment table. However, the 16th segment register is used as a base register. This base register is loaded by the operating system, with a new value each time control is transferred to a different user program. The base register value defines the start address of extension addressing space in primary memory for the program in question, the following consecutive 32K words of memory space being reserved exclusively for extension addressing space. The 16 bit logical CPU address added to the base register value defines an absolute address in extension addressing space.

Figure 7:
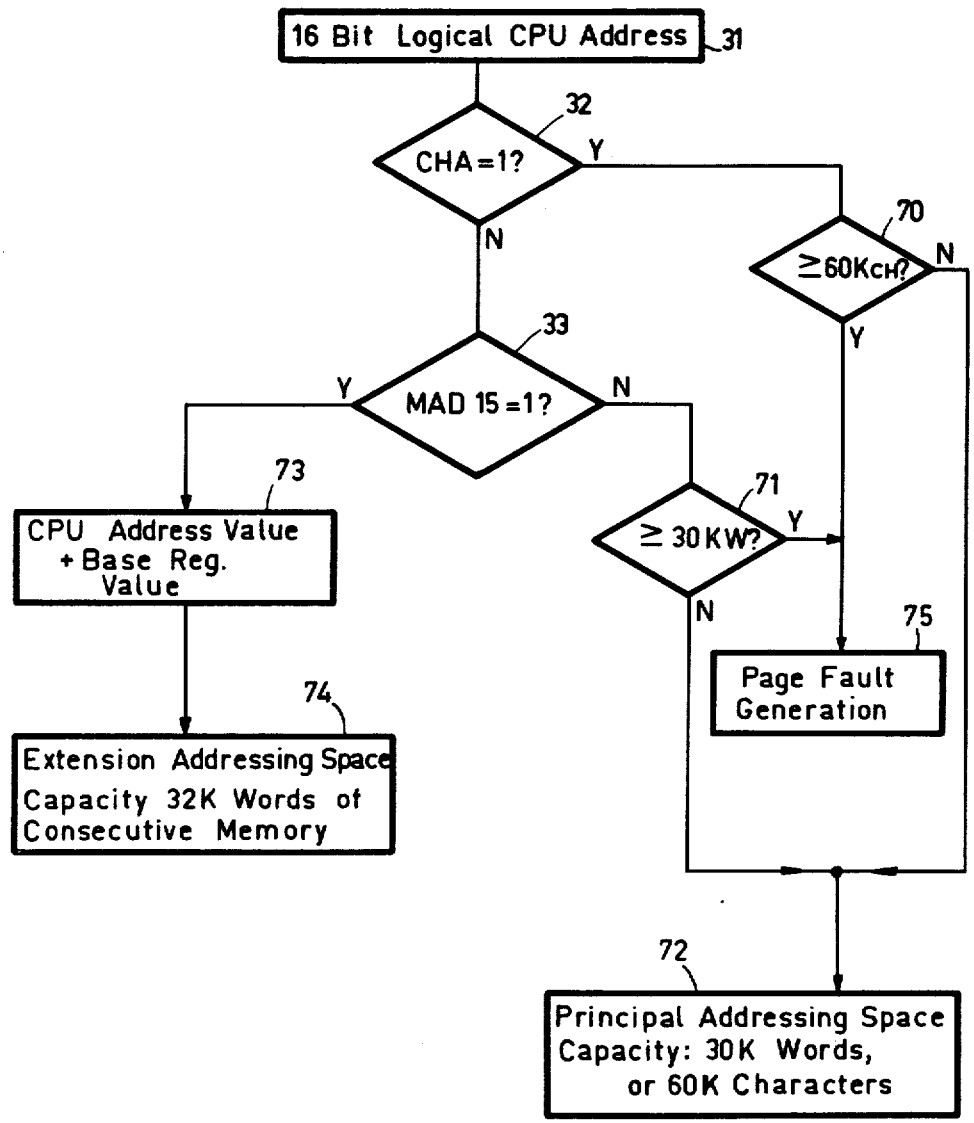
FIG. 7 is a flowchart describing the principal sequence of steps utilized in the addressing mechanism to realize a variant of the invention using a base register.

The addressing mechanism described with reference to the flowchart of FIG. 3 is used in a modified form. This modified mechanism is described with reference to the flowchart of FIG. 7. As described before, when the user program needs to access memory the logical CPU address word (31) is examined to determine whether it is a character address (32) or an even or odd word address (33) for selection of the appropriate addressing space. Because the last register (register 15) in the segment table is used as a base register, only 15 registers, (0–14) are available for defining page addresses, that is, a maximum of 15 pages of 2K words equivalent to 30K words can now be addressed via the segment table. If an odd word address is specified, the CPU address is added to the base register value (73), which defines the location of the required word in extension addressing space (74). If a character address is specified, the address value is examined in (70) and if ≧60K a page fault is generated (75) and appropriate action taken by the system. Otherwise the character address is directed to principal addressing space (72). Similarly if an even word address is specified the address value is examined (71) and if $\geq$30K a page fault is again generated (75), else it is directed to principal addressing space (72). Thus principal addressing space is limited to 30K words instead of 32K words, while extension addressing space consists of 32K words of consecutive memory in which paging operations are not possible. The highest 2K words of even addresses, or the highest 4K characters, cause a page fault.

Figure 8:
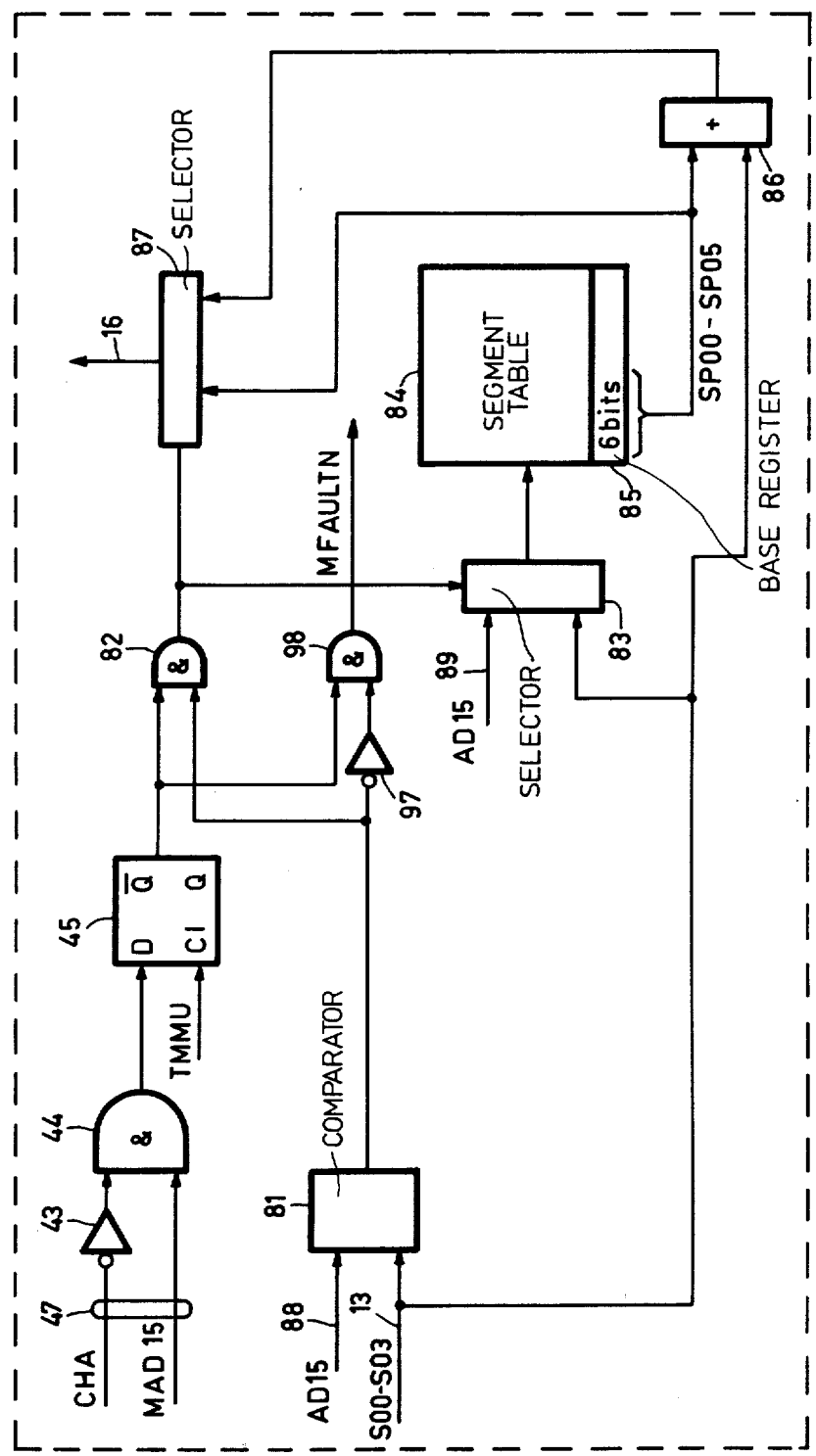
FIG. 8 is a logical block diagram showing an embodiment incorporating the additions and modifications necessary to the MMU in order to realize a variant of the invention using a base register.

This specific embodiment is described with reference to the logic block diagram of FIG. 8 and the flowchart of FIG. 9. FIG. 8 shows the modifications necessary to the normal MMU. In the following description reference to FIG. 8 is implicit unless explicit reference is made to FIG. 9.

The CPU controls MMU activation relative to whether address translation is required, or direct memory activation in the absence of address translation, as described with reference to FIGS. 1 and 2, and shown as (50) in FIG. 9. As further described with reference to FIGS. 4 and 5 bits CHA, MAD 15 and S00–S03 are sent to the MMU when address translation is required; shown as (51) in FIG. 9. If a character address, or even word address is specified the $\overline{Q}$ output of bistable (45) is set to logic 1 by means of (43), (44) and signal TMMU, otherwise it is reset to logic 0. Thus if CHA.MAD=true shown as (90) in FIG. 9, extension addressing space is selected, principal addressing space being selected for all other values of bits CHA.MAD 15. If an even word address $\geq$30K, or if a character address is $\geq$60K, the 4 bit segment pointer S00–S03 (13) will be 1111 (binary 15), otherwise at least 1 of the 4 bits will be 0. Thus (81) is a 4 bit comparator which compares one set of 4 inputs (88) set to logic 1 (binary 15), to the other set (13). This is shown as (91) in FIG. 9. If (13) < (88) output of (81) will be logic 1. If principal addressing space has been selected, output $\overline{Q}$ of (45)=logic 1 and output of AND gate (82) will be logic 1 will in turn control selector (83) to select the segment pointer (13) which will address the relevant segment register in segment table (84). Thus the relevant page number (6 most significant bits SP00–SP05) will be gated from the addressed register and selected for output by selector (87) which is conditioned by the output of (82). This is shown as (92). This is shown as (92) in FIG. 9.

If an odd word address is specified (CHA.MAD 15 =true) the $\overline{Q}$ output of (45) is set to logic 0 causing output of AND gate (82) to go to logic 0 which in turn conditions selector (83) to select input AD15 (88) which is permanently wired to give a value of binary 15. Thus the output is forced to binary 15 and the base register (85) is selected, shown as (93) in FIG. 9. The 6 bit base register value SP00–SP05, which defines the start address of extension addressing space, is added to the segment pointer (13) in a 6 bit adder (86) with the bits being aligned so that the 4 least significant bits of the 6 bit base register value (SP02–SP05) are directly added to the 4 bits of (13). The output of adder (86) is selected by selector (87) which is controlled by the output (logic 0) of (82). These bits on output (16) define the 6 most significant bits of the address in extension addressing space. This activity is shown as (94) in FIG. 9. The output of comparator (81) is not significant when extension addressing space is selected, the output of (45) controls the logical sequence.

If principal space is being addressed output of $\overline{Q}$ of (45)=logic 1, and if the magnitude of the address $\geq$30K words or 60K characters, S00–S03=1111, then by means of invertor (97) the output of AND gate (98) will go to logic 1 thus causing generation of a page fault signal MFAULTN.

This page fault signal to the CPU will cause the execution of the running program to be stopped and the system to take appropriate action. For example generation of a page fault puts the CPU into system mode (FU=0) and initiates a diagnostic program contained in the operating system which informs the user of the attempted address violation. The remainder of the address translation procedure is as described with respect to FIGS. 1 and 2 and is shown as (55) in FIG. 9.

The maximum value that can be loaded into the base register (85) is limited to SP00–SP05=110000, which will define a start address of 96K in memory for extension addressing space, the following consecutive 32K words of memory (96K–128K words) being reserved for address translation via extension addressing space. The minimum value that can be loaded into the base register (85) will define the start address of extension addressing space immediately after the system area, the following consecutive 32K words again being reserved. The operating system which loads the base register value, and thus defines extension space reservations, will not load principal addressing space pages within this reserved area.

Another base register technique in which the highest 2 K words of principal addressing space (30K–32K words) can be utilized as described with reference to FIGS. 10 and 11. FIG. 10 is a modified version of the logical block diagram of FIG. 8 and FIG. 11 a modified from of the flowchart of FIG. 9.

Figure 9:
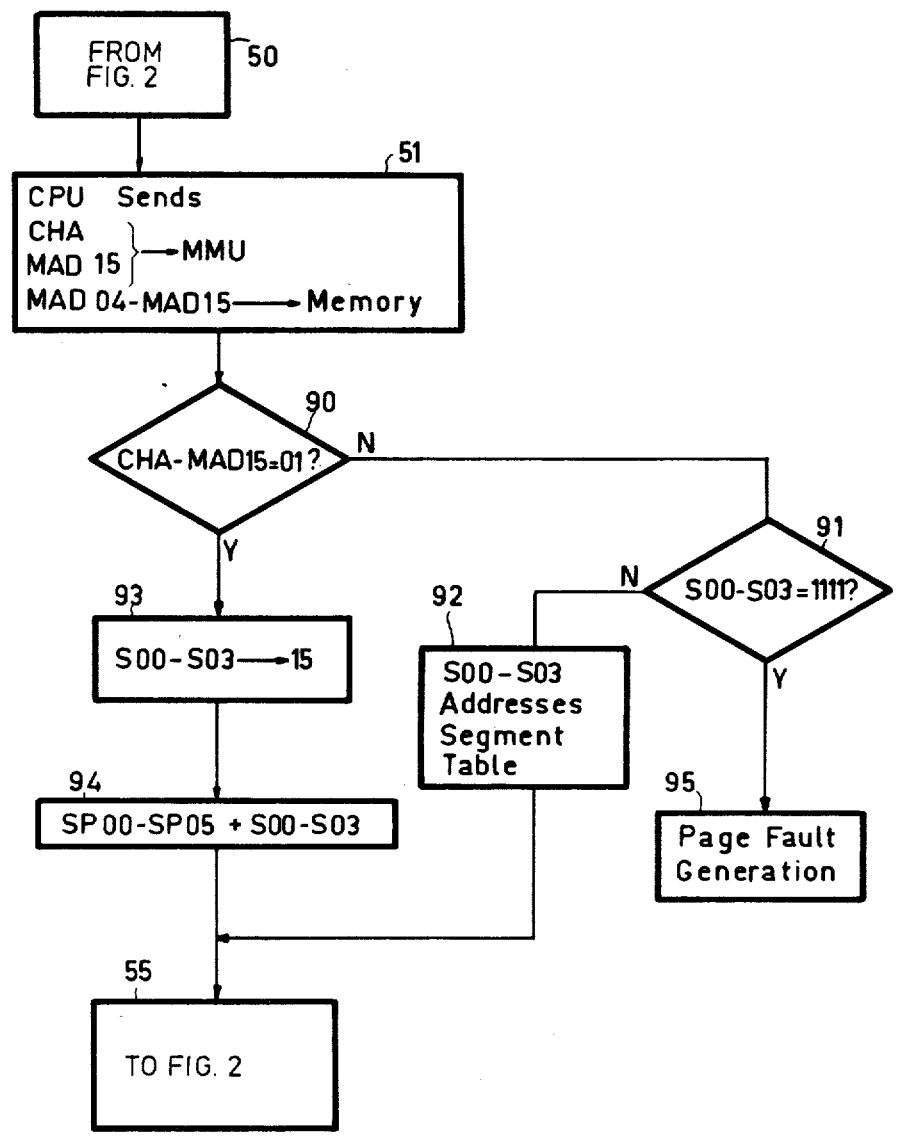
FIG. 9 is a system flowchart describing the principal sequence of steps necessary to realize the variant of the invention described by the embodiment of FIG. 8.
Figure 10:
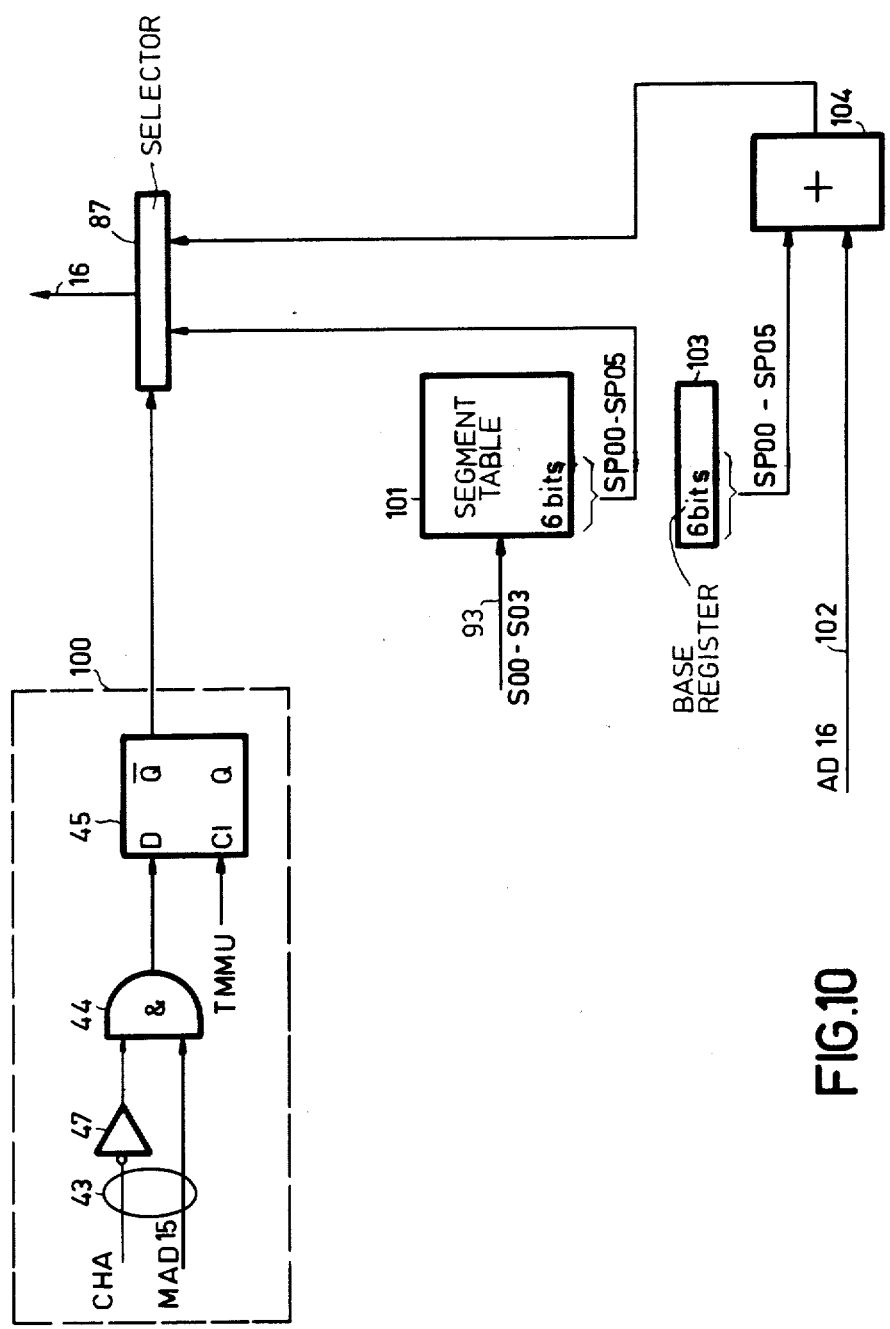
FIG. 10 is a logical block diagram showing the modifications necessary to the embodiment shown in FIG. 8 in order to realize a further variant of the invention using a base register.
Figure 11:
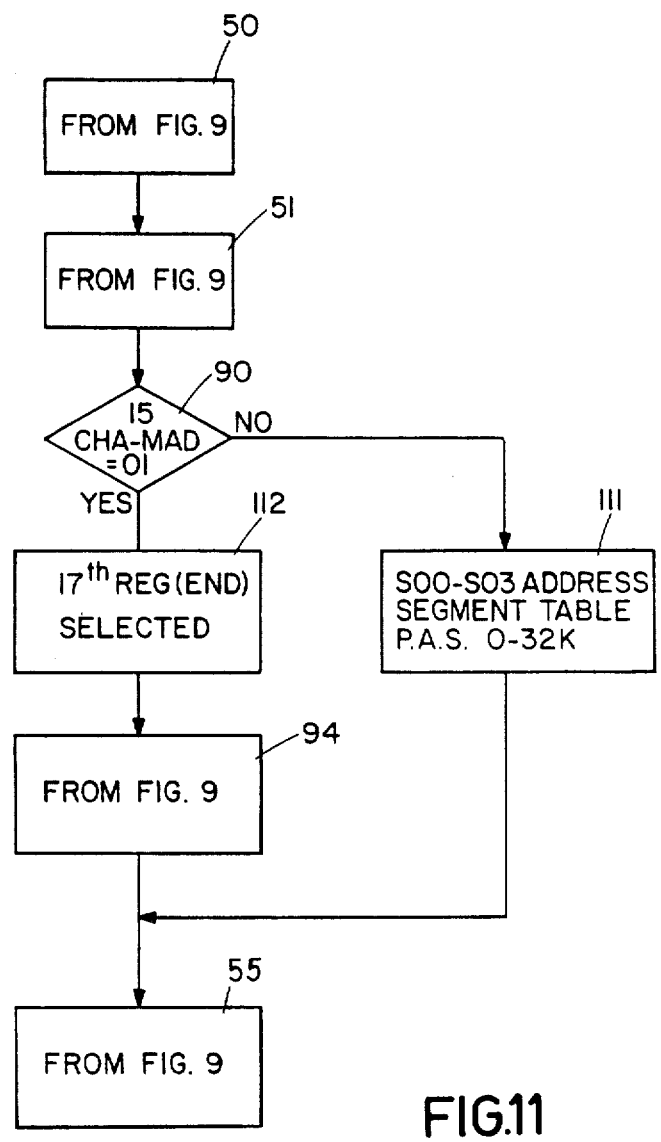
FIG. 11 is a system flowchart describing the principal sequence of steps necessary to realize the variant of the invention described by FIG. 10.

In FIG. 10 the logic shown as block 100 is the same as in FIG. 8, while in FIG. 11 the blocks 50, 51, 90, 94 and 53 are the same as in FIG. 9. The selection of either principal or extension addressing space is performed in the manner as described with respect to FIGS. 8 and 9, that is, if CHA.MAD 15=true extension addressing space is selected, else principal addressing space is selected. If principal addressing space is selected, segment pointer S00–S03, 13, is automatically selected to point to one of sixteen registers in segment table 101 shown as 111 in FIG. 11. Thus sixteen pages of 2K words of principal space can be addressed. As already described, the output of the relevant register is gated on output address lines 16 via selector 87 conditioned by 100. If extension addressing space is selected the contents of the 17th register 103 which is the base register become significant, shown as 112 in FIG. 11. Base register 103 contains a 6 bit address SP00–SP05 defining the start address of 32K words of consecutive extension addressing space. SP00–SP05 is added to a 5 bit hardwired input address 102, which has binary value 16, in adder 104, the result being gated on address lines 16 via selector 87 conditioned by logic 100. The rest of the flowchart for FIG. 11 is as shown for figure 9, block 55. There is no address violation in this case; therefore MFAULTN is not generated.

The variants of the invention using only one segment table use less hardware than the 2 segment table implementation and do not need any additional instructions to be added to the CPU. However a small overhead is imposed for each address translation, which is the time required to add the segment table pointer to the base register value. Therefore each variant of the invention has its particular advantages in particular applications.

Figure 12:
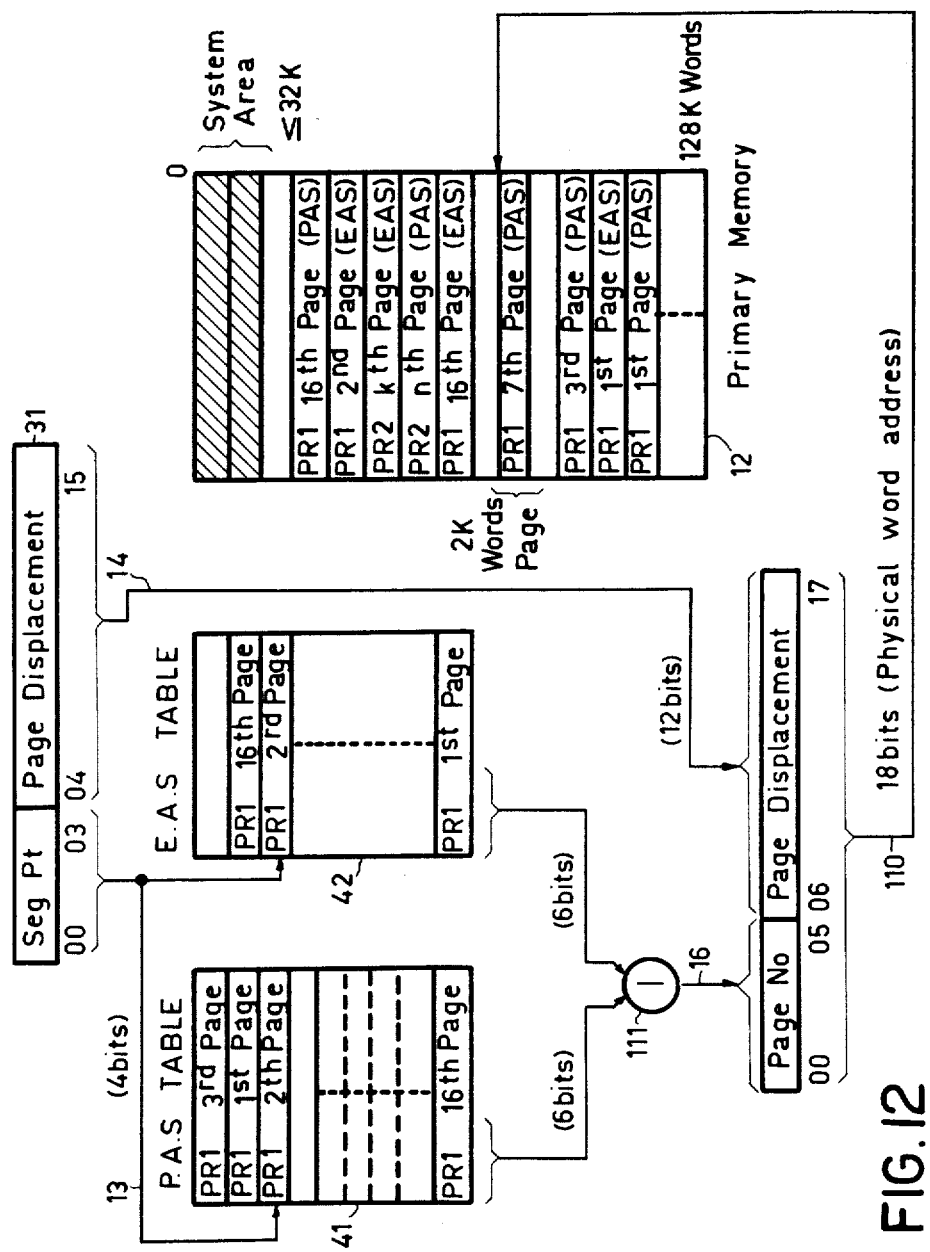
FIG. 12 is a diagram showing symbolic address translation and memory mapping used in an embodiment of the invention with two segment tables.

FIG. 12 shows how the pages of a user program might be mapped into real memory (12) for the embodiment of the invention using two segment tables, principal addressing space table (P.A.S.) (41) and extension addressing space table (E.A.S.) (42). Memory (12) is shown to contain only a "working set" of the pages of running program PR1. At a given time either a P.A.S. or E.A.S. page is addressed via symbolic OR gate 120. Pages of a previously executed program (n$^{th}$ and k$^{th}$ pages) are resident in (12) and can be overlaid when required. In FIG. 12, segment pointer (13) page displacement (14), page number (16) and logical address (31) are as previously described. The 18 bit translated physical memory address is 121.

Figure 13:
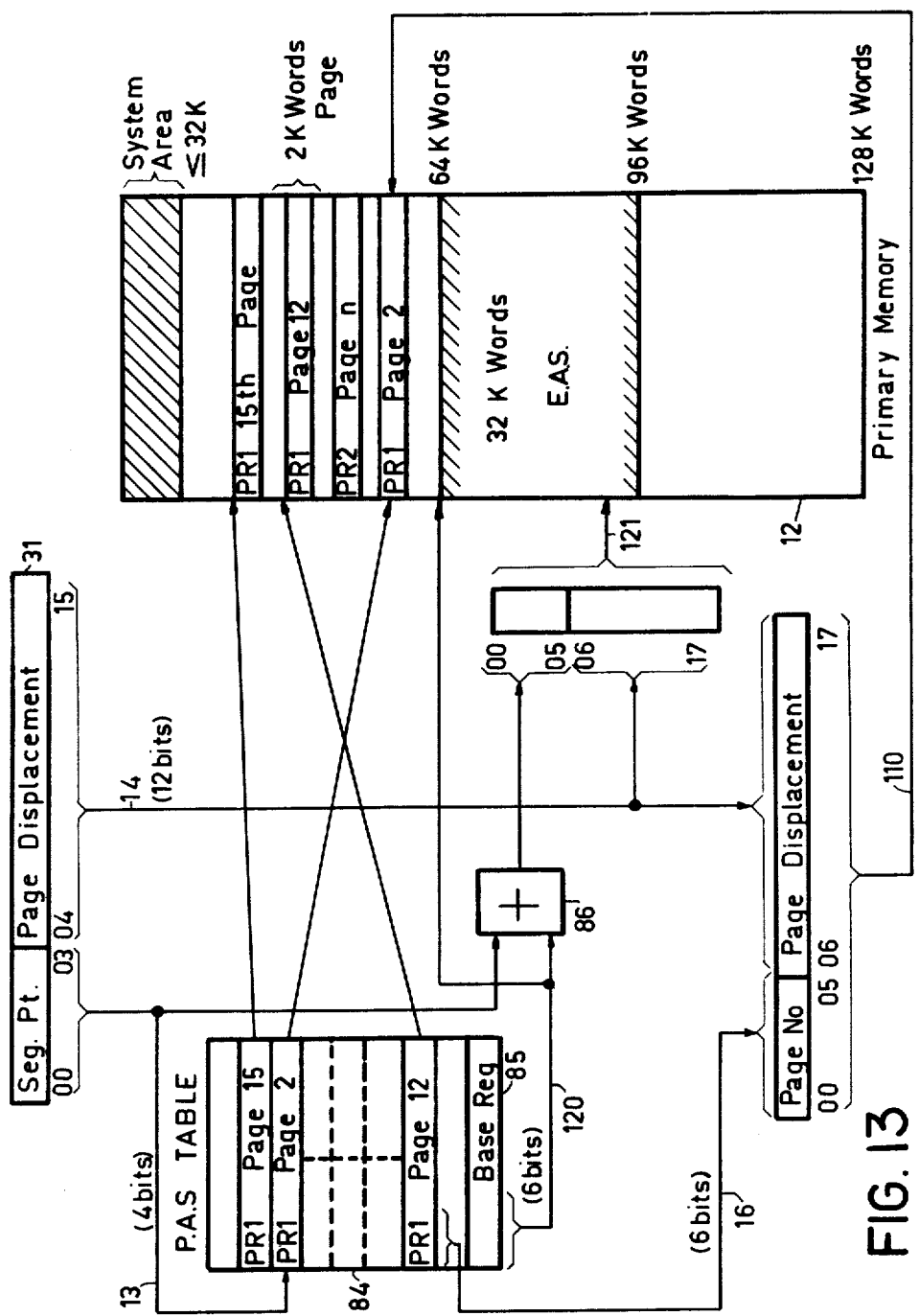
FIG. 13 is a diagram showing symbolic memory mapping in an embodiment of the invention using a base register in the manner described with respect to FIG. 8.

FIG. 13 shows memory mapping for the embodiment of the invention using a base register as described with respect to FIG. 8. Principal addressing space (P.A.S.) table pages for current user program PR1 are shown mapped onto (12) with the n$^{th}$ page of a previously executed program still resident in (12). Once again only a working set of pages of PR1 are loaded into (12). The 16th register of P.A.S. table (84) shown as (85) is the base register which is loaded with a 6 bit value (13) which defines the start of extension addressing space (E.A.S.) in (12). In the FIG. 13 this is shown as 64K. E.A.S. occupies the following 32K words of consecutive memory up to address 96K. The pointer (131) addresses E.A.S. area when E.A.S. is specified via (85), (130), adder (14). All other elements have been previously defined. Although not part of the present invention the impact on present software for the P 800 series is mentioned in order to show the value of the invention. Only minor modifications to the assembler and linkage editor are required. Either a new directive or new pseudo instructions such as extended data and extended reservation need to be added to the assembler to direct it to principal or extension addressing space, thus making the system virtually transparent to the user. The only impact on the monitor program is at the level of the macro instruction which needs to load different segment table register groups.

Figure 14:
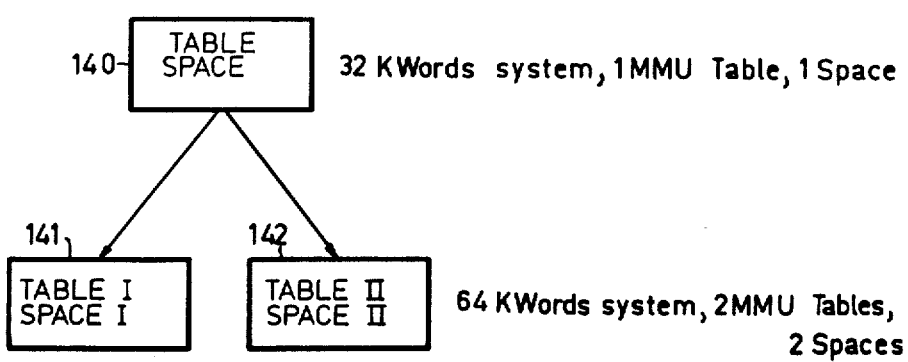
FIG. 14 illustrates the compatibility between an existing 32K word system and the 64K word system using two segment tables as described in the present invention.

Upwards compatibility between the 32K word and the 64 K word system proposed by the invention exists, the tables being loaded by the operating system so that the same space is mapped into both system. The compatibility between a 32K word and proposed 64K word system of the invention using two segment tables is shown symbolically in FIG. 14 in which, (140) is the principal addressing space table for the 32K word system and (141) and (142) are principal and extension addressing space tables for the 64K word system of the present invention respectively. For the embodiment of the invention using a base register, compatibility between 32K and 64K word system also exists, the difference being that mapping in extension addressing space is done over a consecutive memory region.

The invention and its variants have been described for a 16 bit system. However, the technique may readily be used with other word sizes.

TABLE I (1) CPU⟶MMU Signals

| | |
|---|---|
| BSYCPUAN: | CPU has I/O bus control. Validates bus signals and controls all MMU operations. |
| FU = 1: | CPU in user mode. Any memory violation sets page fault. |
| FU = 0: | CPU in system mode. |
| GFETCH: | Fetch cycle is executed by CPU. Instruction counter value is loaded into MMU P-buffer. |
| OSCFLO: | CPU clock signal used by MMU for internal timing. |
| SP00–SP03: | Logical page address (segment pointer) from CPU P-counter (instruction counter). |
| TMMU: | Translation control signal; utilized for page address translation, and memory activation by MMU. |
| TL/TS: | MMU load/store instruction control signal. |

(2) MMU⟶CPU Signals

| | |
|---|---|
| MFAULTN: | Page fault detected during address translation. |
| MMUABS: | Held inactive when MMU is present. |

(3) I/O Bus⟶MMU Signals

| | |
|---|---|
| BI/000–BI/015: | Data used during Table load WER operations. |
| CLEARN: | Clear signal for initializing system. |
| TRMN: | Memory reply signal, validates data during Table Load/Store instruction. Releases memory during address translation. |
| MAD04–MAD15: | Address lines used to select MMU during WER instruction and store CPU instruction counter value during Fetch instruction cycle. |

(4) MMU⟶I/O Bus Signals

| | |
|---|---|
| BI/000–BI/015: | Data used during Table store instruction or page fault loading operations. |
| MAD128, 64, SP00–SP03: | Memory address lines for physical page addresses from segment table. Shown as MMU to memory in the figures for clarity. |
| TMRN: | Activates memory during page address translation if no page fault detected. |
| TRMN: | Used for external register reply to CPU in WER instruction. |

Note:
The CPU⟷I/O Bus and Memory⟷I/O Bus Signals are completely defined in document. No special interface signals other than those already available are needed to realize the invention.

We claim:
1. A computer system comprising central processing means (10) random access memory means (12), memory management means (11); and bus means (17) interconnecting said central processor means, said random access memory means and said memory management means, comprising:
said random access memory means having a sequence of word locations of equal length, each location accommodating a word, a predetermined fraction of said word locations containing two character locations of equal length, each location accommodating a character being half as long as a word, said random access memory means being connected to said bus means by means of an address input (MAD 00—MAD 15), a bidirectional data line (BIO 00-BIO 15), a character selection signal (CHA) input, and a handshake interconnection (TMRX, TRMN);
said central processing means being connected to said bus means by means of an address output (MAD 00—MAD 15), a bidirectional data line (BIO 00-BIO 15), a character selection signal (CHA) output, and a handshake interconnection;
said central processing means having address generating means for generating N-bit addresses on said address output, and first signalling means for gener- ating a character detection signal, a first value of said character detection signal signalling that an accompanying address is directed to a word location as one of $2^N$ different word locations;

a second value of said character selection signal signalling that an accompanying address is directed to a character location, in that one predetermined address bit operates as first/second character location selecting bit, the remaining (N−1) bits then operating to select a word location in one predetermined half of said $2^N$ different word locations;

said memory management means being connected to said bus means by means of an address input (MAD 00 . . . MAD 15), a bidirectional data line (BIO 00-BIO 15) and a handshake interconnection, said memory management means being connected to said central processing means by means of a segment table pointer line (13), said memory management means being connected to said random access memory means by means of a physical page number line (16) for forwarding a page selection signal.

2. A system as claimed in claim 1, wherein said predetermined address bit is the least significant among said N bits.

3. A system as claimed in claim 2, characterized in that said memory management means comprise a first k-register segment table for implementing paged memory operations within said predetermined half of said $2^N$ different word locations, and a second k-register segment table for in case of said first value of said character selection signal and a predetermined value of said predetermined address bit implementing paged memory operations within the other half of said $2^N$ different word locations.

* * * * *